(12) United States Patent
Bartholic

(10) Patent No.: US 6,878,656 B2
(45) Date of Patent: Apr. 12, 2005

(54) METHOD FOR PREPARING A SUBSTITUTE FOR FRESH FLUID CATALYTIC CRACKING CATALYST

(76) Inventor: David B. Bartholic, 75 Wetumpka La., Watchung, NJ (US) 07060

( * ) Notice: Subject to any disclaimer, the term of this patent is extended or adjusted under 35 U.S.C. 154(b) by 101 days.

(21) Appl. No.: 10/265,249

(22) Filed: Oct. 7, 2002

(65) Prior Publication Data

US 2004/0067841 A1 Apr. 8, 2004

(51) Int. Cl.[7] .................................................. B01J 29/06
(52) U.S. Cl. ............................. 502/64; 502/60; 502/79
(58) Field of Search .............................. 502/60, 64, 79; 208/113, 118, 120.01

(56) References Cited

U.S. PATENT DOCUMENTS

| | | | |
|---|---|---|---|
| 4,686,197 A | | 8/1987 | Elvin |
| 4,985,136 A | * | 1/1991 | Bartholic .................... 208/153 |
| 5,188,995 A | | 2/1993 | Maholland et al. |
| 5,389,236 A | | 2/1995 | Bartholic et al. |
| 5,888,919 A | | 3/1999 | Bartholic |
| 5,900,383 A | | 5/1999 | Davis et al. |
| 6,046,125 A | | 4/2000 | Pavel |
| 6,509,290 B1 | * | 1/2003 | Vaughn et al. .............. 502/214 |

FOREIGN PATENT DOCUMENTS

| | | |
|---|---|---|
| EP | 0 499 248 | 8/1992 |
| EP | 0 499 258 | 8/1992 |
| EP | 0 408 606 | 1/1993 |
| WO | WO 99/55800 | 11/1999 |

* cited by examiner

*Primary Examiner*—Christina Johnson
(74) *Attorney, Agent, or Firm*—Finnegan, Henderson, Farabow, Garrett & Dunner, L.L.P.

(57) ABSTRACT

A method for preparing a mixture of FCC catalyst components for use in an FCCU, which comprises: performing an analysis of an FCCU operation; determining the catalyst requirements for the FCCU, based on said analysis; determining the catalytic properties of at least two FCC catalyst components selected from the group consisting of untreated equilibrium FCC catalyst, reactivated equilibrium FCC catalyst, demetallized equilibrium FCC catalyst, reactivated and demetallized equilibrium FCC catalyst and fresh high activity FCC catalyst containing a zeolite component; and blending said at least two components in proportions, based on the determined properties of said at least two components and the determined catalyst requirements, to form a mixture of the components suitable for addition to the FCCU.

13 Claims, 1 Drawing Sheet

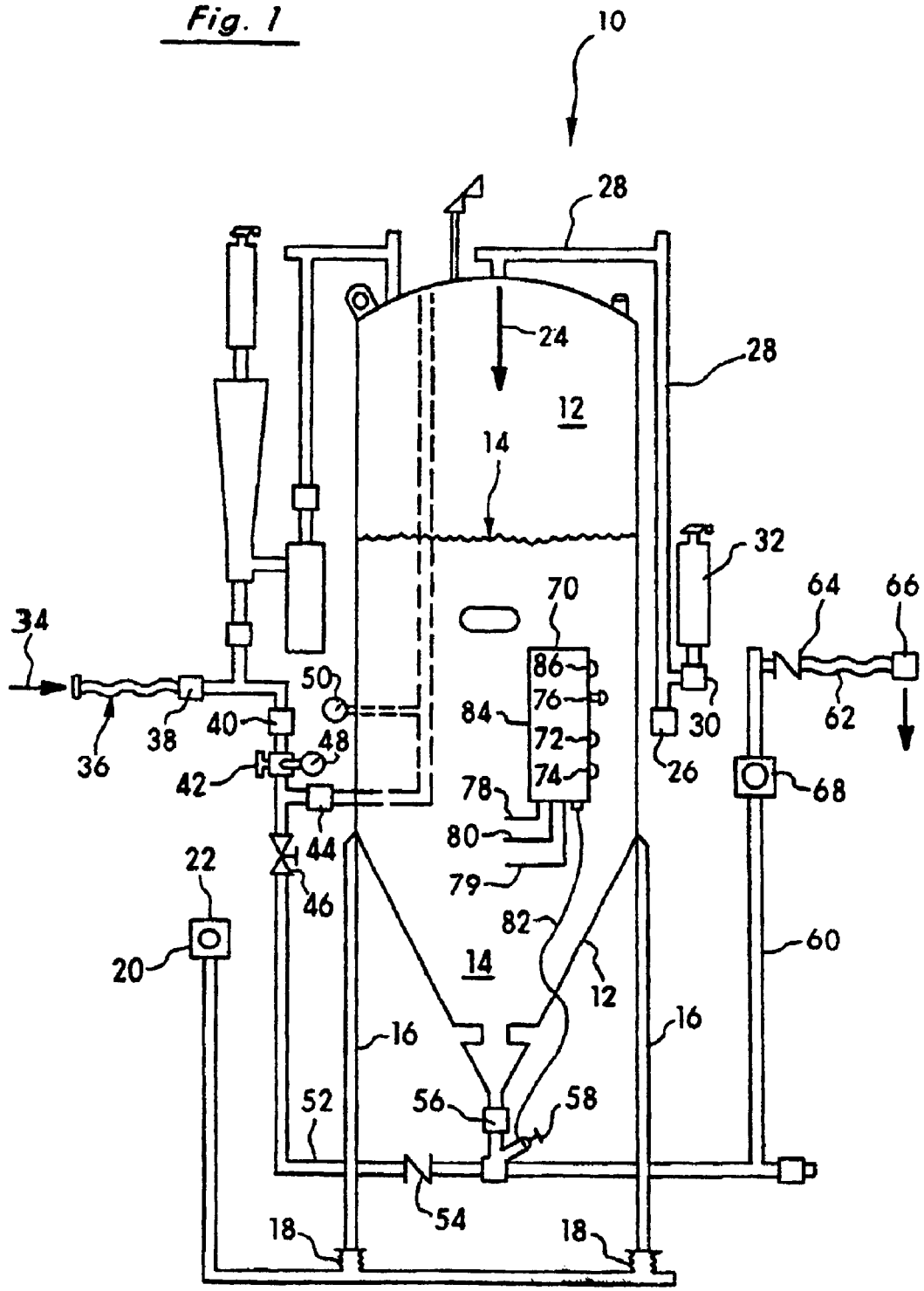

METHOD FOR PREPARING A SUBSTITUTE FOR FRESH FLUID CATALYTIC CRACKING CATALYST

DESCRIPTION OF THE INVENTION

Field of the Invention

This invention relates to a method for improved fluid catalytic cracking (FCC) catalyst management by preparing a mixture of two or more of fresh, treated FCC equilibrium catalyst, untreated FCC equilibrium catalyst, and one or more FCC additives for use as a substitute for fresh catalyst addition to an FCC unit (FCCU) or for use as supplemental catalyst addition along with a reduced amount of fresh catalyst addition to the FCCU.

BACKGROUND OF THE INVENTION

The fluid catalytic cracking (FCC) process has been in operation for over 50 years and has gone through many changes. These changes have been in the well-known catalyst and additives employed in the process, as well as mechanical and process changes. In the last decade there has been a slow but constant pressure and realization that proper FCC catalyst management can result in a significant reduction in the FCC operating costs and improved FCC operating stability.

A first significant disclosure for improved FCC catalyst management was disclosed in my European Patent Application No. 0 408 606 B1 "Fluid Catalytic Cracking (FCC) Catalyst and Additive Loading Control System" and in the Bartholic, Lippert U.S. Pat. No. 5,389,236 "Method and Apparatus for Controlling Introduction of Catalysts into FCC Units", which are incorporated by reference in their entirety in this application. These two publications disclose an improved method for adding fresh FCC catalyst and FCC additives to an FCCU. Refiners who have employed these systems have noted improvements in the operating stability of their FCC unit (FCCU) and reduced catalyst/additive usage, which translates into reduced unit operating costs, and more on-specification products. The use of these systems for FCC additive addition has been widely employed. However, the use of these systems for fresh catalyst addition has not been widely accepted, because it requires a fairly large capital expenditure and replacement of the existing fresh catalyst storage hopper of the FCCU.

In my U.S. Pat. No. 5,888,919 "Process for Zeolitic Catalyst Reactivation" and the Bartholic, Davis U.S. Pat. No. 5,900,383 "Process for Increasing the Activity of Zeolite Containing Particulate Solids", which are incorporated by reference in their entirety in this application, there are disclosed processes which enable for the reuse of FCC equilibrium catalyst by increasing the equilibrium catalyst activity through forming what is referred to herein as "reactivated FCC equilibrium catalyst".

There are also well-known processes for removing deposited metals, primarily Ni and V, from equilibrium catalyst to form what is referred to herein as "demetalized equilibrium FCC catalyst". One such process, known as DEMET, was originally developed by ARCO in the 1950's and 1960's to remove metals from high aluminia FCC equilibrium catalyst. This process was further developed to remove metals from zeolitic FCC equilibrium catalyst. An improved DEMET process is described in U.S. Pat. No. 4,686,197, which is incorporated herein by reference. More recently, Coastal Corporation, has further refined this process to remove metals (demetalization) and increase the activity (reactivation) of zeolitic catalyst. This latter process is referred to as the ACT Process and is described in U.S. Pat. No. 6,046,125, which is incorporated herein by reference. It should be noted that demetalization refers to the removal of one or more metal elements that are deposited on the catalyst from the feed and are considered to be detrimental to the FCC catalyst activity or yield structure of the product of the process. Among these metals are Ni, which increases hydrogen production, and Na and V, which are also detrimental to catalyst activity.

Up until now, the typical refiner has added fresh catalyst and additives to maintain the desired catalyst activity in the FCCU and has withdrawn excess equilibrium catalyst to maintain the desired unit inventory. In an FCCU, I estimate that only about 30%, more or less, of the circulating catalyst inventory has a substantial catalytic activity. The other 70 wt %, more or less, is relatively catalytically inert. Of the 30% active material, the activity of the circulating catalyst particles ranges from a high of fresh catalyst activity to very low activity. If one uses an activity test unit to quantify the activity (defined as conversion to lower molecular weight hydrocarbons of a standard gas oil feed in the activity test unit divided by the quantity {100–[conversion in the activity test unit]}), the circulating catalyst inventory in a typical FCCU might have an activity of 2.33 (for 70% conversion in activity test unit; i.e., 70/100–70=2.33). The fresh catalyst activity might be 13.28 (for 93% conversion) or 5.7 times as active as the circulating catalyst inventory, which is sometimes referred to equilibrium catalyst or ECAT. The inert catalyst particles in the circulating catalyst inventory might have an activity of 0.33 (for 25% conversion). More importantly, if one compares the coke yield on the activity test for these activity ranges, one might find the coke yield for the fresh catalyst to be 3 to 5 times higher than the coke yield on the ECAT. This is important since it limits the zeolite content of fresh FCC catalyst to about 15–30% in the typical FCCU.

Because of environmental concerns and disposal costs, most refiners withdraw a minimum of equilibrium catalyst from their units. In this case, the fresh catalyst added to the FCCU is typically selected and added to maintain a desired yield structure and unit activity and to make up for unit catalyst losses through the cyclones of the FCCU.

Equilibrium catalyst or ECAT is defined as the catalyst that is circulating in the FCCU and consists of the fresh FCC catalyst and FCC additives which were just added to the unit plus the FCC catalyst and FCC additives which have made more than one cycle between the reactor and the regenerator of the FCCU and are less active than the fresh catalyst and additives. In those units that process feedstocks which contain metals and other catalyst poisons the equilibrium catalyst also has thereon metals and poisons deposited from the feedstock.

Some refiners processing high quality feeds (containing low metals and catalyst poisons) may elect to add more fresh catalyst than the amount lost from the unit. Therefore, they will withdraw ECAT that is usually of high quality (low metals, higher than normal activity) that they will then sell to operators of units which process residual oil or might be experiencing a high catalyst loss problem. This high quality ECAT is typically sold at less than 50% of the fresh catalyst selling price.

Units processing residual oil that contains metals, such as Ni, V, and Na, and other catalyst poisons in excessive amounts will require that the refiner add fresh catalyst or high quality ECAT to maintain the unit ECAT activity and metals level at some predetermined value that will give the desired unit yield structure and profitability. In this case, usually the amount of catalyst addition is more than the catalyst losses from the unit, so the refiner must remove ECAT from the unit for disposal. Since this ECAT is of poor quality, the refiner must pay for its disposal.

In a typical FCCU adding fresh catalyst, a large percentage (30–70%) of the fresh catalyst is lost through the cyclone system of the unit. The majority of the initial loss is the catalyst fines and moisture contained in the fresh catalyst, plus some loss by attrition. The rest of the loss of catalyst from the unit is mainly equilibrium catalyst and the amount varies with the cyclone efficiency, because the cyclones are less than 100% efficient in separating the catalyst from the vapors. In FCC units that have metals in the feed, the type and quantity of catalyst addition will be determined to control both the equilibrium catalyst activity/selectivity and level of metals deposited on the catalyst. Some refiners have added purchased equilibrium catalyst to their unit to control the unit inventory, selectivity, metals level and/or activity of the circulating catalyst inventory (note: ECAT losses are considerably less than that of fresh catalyst, since the ECAT has very low fines and moisture content and low attrition). Typically, these refiners will purchase low metals equilibrium catalyst with an activity equal to or greater than the catalyst activity in their units and add this purchased ECAT in place of fresh catalyst addition.

Up until now, because of limitations in FCCU catalyst hopper/storage capacity to segregate catalyst types, the typical refiner has usually been restrained to the use of one fresh FCC catalyst or one outside supply of FCC ECAT that is added from the fresh catalyst storage hopper of the FCCU. That is, the typical FCCU has one fresh storage hopper and one equilibrium storage hopper. Therefore, if the refiner purchases FCC ECAT from an outside source, he must use the fresh catalyst storage hopper to add this material. If he adds this outside-purchased material to the ECAT storage hopper, there will be cross contamination with the unit's ECAT when unit ECAT is withdrawn to maintain unit inventory or during a shutdown, when the unit inventory is removed from the unit to the ECAT storage hopper. If the refiner wants to add both fresh and outside ECAT to his unit, then he must install another addition hopper for this outside ECAT.

As the number of catalyst additives, fresh catalyst, and equilibrium catalyst employed in the FCCU increases, the number of hoppers for catalyst addition and catalyst storage increases, and the catalyst management associated with this part of the FCCU operation takes up more and more time and resources. Every time a new catalyst, fresh or equilibrium, or catalyst additive, arrives at the refinery, it must be weighed on the refinery scale, the hopper must be inventoried by transferring from the truck, rail car, or container. This transfer requires depressuring the existing hopper, pulling a vacuum on the hopper, connecting the truck, rail car, or container to the hopper, connecting up pressuring air and conveying air, and manually regulating the transfer of the material into the hopper. After the transfer is complete, the hopper must be pressured and placed back in service, and the above procedure reversed so that the truck, rail car, or container can be weighed to determine the amount of catalyst delivered. Given the size of the equipment involved, this procedure may take eight hours or more, and ties up personnel that have other duties.

The present invention concerns a method which improves catalyst management so as to reduce the associated time required by the refinery personnel. The present invention also reduces the overall catalyst costs. A further objective of the present invention is to reduce catalyst transportation costs. Also, the present invention enables the refiner to form an alliance with a single catalyst supplier, who would supply all the refiner's requirements for fresh, equilibrium, demetalized, and reactivated FCC catalyst and FCC additives. This is especially useful as more and more consolidation in the refining industry occurs. Another object of this invention is to utilize the weigh scale function as described in U.S. Pat. No. 5,389,236 to supply signals to an offsite location that can monitor the FCC unit inventory of fresh catalyst and additives. In this way, the refiner can maintain minimum FCC catalyst inventory (lower cost) and the supplier can deliver product only when required. Another object of the present invention is to provide the refiner with the ability to select from a multiple of sources (fresh, reactivated ECAT, demetalized ECAT, additives) for the FCCU "fresh catalyst" (hereinafter referred to as "intermediate fresh catalyst" or, IFC) that will result in the desired unit yield structure and activity at the lowest possible price. Still another object of the present invention is to reduce the refiner's capital requirements, in that he will not be required to add more hoppers or build on-site demetalization or reactivation systems. In addition, this invention enables reuse of ECAT, which will result in the use of less raw materials and energy, reduce unit catalyst losses, result in a higher unit activity than an equivalent fresh catalyst, since more of the ECAT will remain in the unit compared to fresh catalyst, and result in less disposal to landfill.

SUMMARY OF THE INVENTION

What I have discovered is that, by utilizing sources of ECAT, catalyst demetalization facilities, catalyst reactivation facilities, and/or the ability to manufacture fresh catalyst with zeolite contents of greater than 20%, and by blending the resulting materials, with or without FCC additives, an IFC can be produced that will satisfy the refiner's FCC catalyst requirements at a lower cost, e.g., 50% to 80% of the refiner's present fresh FCC catalyst cost. This will also decrease the refiners catalyst management time, capital requirements, number of additive hoppers at the FCCU, and the number of catalyst shipments that need to be received by the refiner. In a preferred embodiment of this invention, a signal from an FCCU's additive hopper(s) to a remote location can be used to facilitate catalyst inventory control and reduce operating costs.

To achieve the objects of the present invention, there is provided a method for preparing a mixture of FCC catalyst components for use in an FCCU, which comprises: performing an analysis of an FCCU operation; determining the catalyst requirements for the FCCU based on said analysis; determining the catalytic properties of at least two FCC catalyst components selected from the group consisting of untreated equilibrium FCC catalyst, reactivated equilibrium FCC catalyst, demetallized equilibrium FCC catalyst, reactivated and demetallized equilibrium FCC catalyst and fresh high activity FCC catalyst containing a zeolite component; and blending said at least two components in proportions, based on the determined properties of said at least two components and the determined catalyst requirements, to form a mixture of the components suitable for addition to the FCCU.

Preferably, the mixture is added to the FCC unit through a weighed catalyst addition system, and a signal from a weighing device is used to control the inventory of the catalyst addition system. If the equilibrium hopper is also equipped with weigh cells, the unit catalyst withdrawals can be automated and the equilibrium catalyst hopper inventory continually monitored, which will improve ECAT management. If the equilibrium hopper is also equipped with weight cells, the unit catalyst withdrawals can be automated and the continually equilibrium catalyst hopper inventory monitored, which will improve ECAT management.

The objectives of this invention can be realized by analyzing the operation of an FCCU and determining the catalyst and additive requirements for the operation, and then premixing all or part of the required FCC catalyst and catalyst additive in an off-site facility, or the individual components of the mixture can be mixed on-site in the addition hopper located in the unit. In a preferred embodiment of this invention, the catalyst addition hopper and ECAT hopper have weight cells or a weighing device that gives a continuous readout of the weight of the catalyst in the hopper. This device can generate a signal which can, if desired, also be supplied to an offsite location, such as the catalyst supplier's offices, so that the supplier can monitor the unit inventory of fresh catalyst, ECAT, and additives. In this way, the refiner can maintain minimum catalyst inventory (lower cost) and the supplier can deliver the necessary catalyst and additives and remove ECAT only when required.

BRIEF DESCRIPTION OF THE DRAWING

The invention will be more fully understood from the following description thereof read with reference to the accompanying drawing, wherein:

FIG. 1 illustrates a preferred apparatus and flow diagram useful in the practice of the present invention.

DESCRIPTION OF PREFERRED EMBODIMENTS OF THE INVENTION

In the practice of this invention, in order to determine what properties must be associated with the IFC catalyst, the supplier and refiner need to analyze the FCC operations. This would normally entail evaluating the currently-used catalyst and additives being added to the unit and ECAT properties (chemical and physical), such as, activity, zeolite content, pore volume, surface area, particle size distribution, additive concentrations, hydrogen production, carbon on catalyst, and the contents of rare earth, sodium, iron, nickel, vanadium, and copper plus any other catalyst properties that might be effecting the operation. One would also evaluate the unit yields and product properties, the unit limitations, the unit's catalyst and additive addition rates and withdrawals, and the refiner's objectives. In addition, the feedstock source and properties, such as, gravity, sulfur, ramsbottom carbon, nitrogen (basic and total), distillation, aniline point, PONA, and the amount of nickel, vanadium, sodium, iron and copper plus any other feedstock related details that might effect the operation should be known.

From the above information, one can then make an IFC catalyst that has properties between the catalyst added to the unit and the ECAT in the unit that will result in an IFC catalyst that will produce the desired unit yields and product properties at a cheaper cost and a significant reduction in unit catalyst losses. Most likely the IFC catalyst requirements that will be the most important will be activity, rare earth content, surface area, hydrogen production, and nickel, vanadium, and sodium content.

The ultimate supplier of the refinery FCC catalyst and catalyst additives preferably has access to facilities needed to blend the components needed to produce the desired IFC. The supplier preferably has access to catalyst testing facilities and be able to produce or acquire high zeolitic content FCC catalyst (which contains >20% <80% of a zeolite component), demetalized ECAT, reactivated ECAT, demetalized-reactivated ECAT, ECAT of various types, and FCC additives as blending components. These components are then tested to determine properties such as for activity, metals, surface area, pore volume, stability, yields, physical and chemical properties, and blended to obtain the desired IFC. As an example, assume that, based on the analysis of the FCCU operation, it is determined that the refiner needs an IFC having an activity of 5.9, minimum nickel activity to produce hydrogen, low vanadium levels, and an acceptable yield structure. The supplier would then take the components' properties and blend the components according to the following formula:

IFC Activity=sum of ($Wt$ % of each component in blend)(Activity of that component)

Where: Activity=(conversion in lab test unit)/[100−(conversion in lab test unit)]

IFC, $wt$ $ppm$ of vanadium=sum of ($wt$ % of each component in blend)($wt$ $ppm$ vanadium of that component)

The components for the IFC blend may be selected from two or more of the following:

a. Fresh catalyst—catalytic active material that is added to the unit to affect the ECAT activity and unit yields and product properties b. Demetalized catalyst—ECAT that has been treated to remove some portion of metals or catalyst poisons that have been deposited on the ECAT from the feed c. Reactivated catalyst—Fresh or ECAT that has been treated to increase its activity.

d. Demetalized-Reactivated Catalyst—ECAT that has been treated to both increase its activity and remove some portion of metals or catalyst poisons that have been deposited on the ECAT from the feed.

e. Additives—any material, liquid or solid, that is added to the FCC unit as a minor component of the circulating ECAT to affect a specific operating characteristic of the FCC operation (such as aid the burning of CO to $CO_2$ in the regenerator, reduce $SO_x$ emissions, increase gasoline octane, etc.)

It should be noted that, for example, a fresh catalyst with 40% zeolite might have a fresh activity of 19; a reactivated ECAT, an activity of 3.0; and a demetalized ECAT, an activity of 2.3. Therefore a blend of these three materials to obtain a 5.9 IFC activity would contain 20% high activity fresh catalyst, 40% of reactivated ECAT, and 40% of demetalized ECAT. This IFC might cost 60% of the equivalent fresh catalyst.

The supplier would then make a laboratory IFC blend of the components and test the IFC blend for the refiner's criteria. Any reactivated ECAT, even that from the refiner's unit would be higher activity than the starting ECAT as shown in the above-mentioned referenced catalyst reactivation patents, so the percentage of high activity fresh catalyst required should be a small percentage of the total blend. Since the manufacturing cost of high zeolite content fresh catalyst is almost identical to lower zeolite content catalyst and the other component costs are a percentage of fresh catalyst, the cost of producing these IFC mixtures with these less expensive components will always be less than the fresh catalyst it is replacing.

If the nickel activity of the blend is too high (i.e. demetalized ECAT is not available or because it is more costly and complicated to remove nickel than V, the ECAT was only treated to remove V) antimony, bismuth or another nickel treatment could be applied to the blend to reduce the nickel activity. Another advantage of this invention is that the blend can be treated or adjusted as required before it is shipped.

DESCRIPTION OF THE PREFERRED EMBODIMENTS

FIG. 1 depicts a preferred catalyst addition apparatus 10. A suitably sized and shaped weigh hopper 12 contains an inventory of IFC material 14. A support system 16 for the weigh hopper 12 is provided with a weighing device 18 such as load cells or scales. The weighing device 18 is preferably connected to a weigh indicator 20 such as a digital display 22. In effect, the weighing device 18 weighs both the weigh hopper 12 and the catalyst inventory 14 contained in said hopper. The weigh indicator 20 can be adapted to display the combined weight of the weigh hopper 12 and catalyst inventory 14. In the alternative, the empty weight of the weigh hopper 12 can be automatically subtracted from the combined weight of the weigh hopper 12 and catalyst inventory 14 so that a read-out display 22 of the weigh indicator 20 shows only the weight of the catalyst inventory 14. In either case, the weighing device 18 will detect changes in the weight of the catalyst inventory 14 over time as catalyst is taken from the weigh hopper 12 and added to a FCC unit not shown in FIG. 1.

The signal to weigh indicator 20 can be routed both locally and to a remote location, such as, off-site at the IFC's supplier's facility or where the catalyst management personnel are located. By monitoring this signal, one can tell such things as the addition rate per day, the present inventory, and predict when a new shipment of IFC should arrive at the unit and schedule accordingly. For management of withdrawn ECAT inventory, the catalyst management personnel would determine when the ECAT inventory was at its limit and schedule to have this ECAT removed from the hopper and sold or disposed of according to the present guidelines.

In one preferred embodiment of this invention, IFC from a source not shown in FIG. 1 is added to the catalyst inventory 14 via a hopper loading valve 26 and catalyst injection pipe 28. The catalyst injection pipe 28 might also serve as a hopper venting system through the use of an appropriate hopper vent valve 30 (which is preferably equipped with a silencer device 32).

Plant air 34 is delivered to the catalyst addition apparatus 10 via an air conduit system 36 such as the flexible hose and pipe system depicted in FIG. 1. The air conduit system 36 also is more preferably provided with various valves, e.g., valves 38, 40, 42, 44, and 46 in order to provide a means for distributing the plant air 34 to various parts of the catalyst addition apparatus 10. The air conduit system 36 is preferably provided with a pressure gauge 48 and pressure gauge 50 for respectively measuring the air pressure outside and inside the weigh hopper 12. In any case, one of the main functions of the plant air 34 is to entrain the catalyst 14 and transfer it to an FCC unit. An air line 52 (especially on provided with a non-return valve 54) carrying plant air stream 34 will most preferably pass under the hopper 12. The bottom of the hopper 12 will be provided with a valve such as a ball valve 56 (preferably one provided with a so-called Thompson valve 58) so that catalyst 14 can be withdrawn from the bottom of the weigh hopper 12 and entrained in the plant air stream 34 when valve 56 is open. The stream of plant air 34 containing the catalyst 14 is then directed to the FCC unit via lines 60 and 62. Line 62 also can be provided with a non-return valve 64 and ball valve 66 as indicated. Line 62 might also be provided with a metering indicator 68 to further check upon the function of the delivery system.

Again, the entrainment of the catalyst 14 into the stream of plant air 34 is preferably controlled by valve 58 which is, in turn, most preferably regulated and monitored by a computer memory and control device 70. Most preferably, the computer memory and control device 70 also will be associated with those mechanical and electrical control and indicator devices normally associated with such processes and equipment in ways which are well known to this art. For example, the memory and control device 70 could be associated with an air supply indicator 72, a valve indicator 74, a manual test button 76, a drain 78, an air supply 79, a remote input 80, a Thompson valve signal 82, a pneumatic control device 84, and an override indicator 86 generally depicted in FIG. 1.

In one preferred embodiment of this invention, a remote signal from the IFC addition hopper 12 would be sent to a remote location so that the supplier would be able to ship the IFC to the refiner only as it is required. It is also possible to send separately each of the blending components to the refinery so that they can be blended in the addition hopper. This might be the case if any of the available components were available at another offsite facility.

In a preferred embodiment, the total FCC catalyst management system, the refiner's ECAT hopper would also be equipped with a catalyst weigh scale. This would allow the refiner to have an accurate record of the FCC unit withdrawals. Combining this withdrawal record with periodic ECAT analysis would allow the refiner to calculate the activity and composition of the ECAT hopper inventory. In a preferred embodiment, the ECAT hopper weigh scale system would send a signal to a remote location so that the ECAT hopper inventory could be controlled. Better still, it would allow for the IFC supplier to determine if the ECAT has a use as a blending component (after reactivation/demetalization) or should be sent to disposal, both of which could be arranged by catalyst management. Up until now, to determine the amount of ECAT withdrawal from the FCCU or the amount of ECAT in the ECAT hopper, the hopper would need to be depressured and measured by dropping a weighed measuring device from the top of the hopper to the ECAT level to get an outage. This outage was then converted to weight on a calculated graph. It is very evident, that this method is less than accurate.

Having described preferred embodiments of the present invention, it is to be understood that these are only exemplary, and the scope of the invention is to be determined by the appended claims and their equivalents.

What is claimed is:

1. A method for preparing a mixture of FCC catalysts for use in an FCCU, which comprises:
    performing an analysis of an FCCU operation, said analysis including:
    (a) evaluating the catalyst currently used in the FCCU and physical and chemical properties of equilibrium catalyst in the FCCU;
    (b) evaluating yields and properties of product of the FCCU and the objectives of the operator of the FCCU; and
    (c) determining properties of the FCCU feedstock that affect the operation of the FCCU;
    determining the catalyst requirements for the FCCU, based on said analysis;

determining the catalytic properties of at least two individual FCC catalysts selected from the group consisting of untreated equilibrium FCC catalyst, reactivated equilibrium FCC catalyst, demetallized equilibrium FCC catalyst, reactivated and demetallized equilibrium FCC catalyst and fresh high activity FCC catalyst containing a zeolite component; and blending said at least two individual FCC catalysts in proportions, based on the determined properties of said at least two catalysts and the determined catalyst requirements, to form a mixture of the catalysts suitable for use as a catalyst in the FCCU.

2. The method of claim 1, further including adding the mixture to the FCCU through a weighed catalyst addition-storage system.

3. The method of claim 1, further including adding one or more FCC additives to the mixture.

4. The method of claim 1, where said high activity fresh catalyst contains more than 20% zeolite.

5. The method of claim 1, wherein the blending is performed at the site of the FCCU.

6. The method of claim 1, wherein the blending is performed at a location remote from the site of the FCCU.

7. The method of claim 1, v/herein the FCCU includes an FCC catalyst addition system, and a signal from an on-site weighing device is used to control the catalyst inventory of the addition system.

8. The method of claim 1, wherein the FCCU includes a weighing device on an equilibrium catalyst hopper, the weighing device is used to control unit catalyst withdrawals from equilibrium catalyst hopper inventory, and/or catalyst disposal requirements.

9. The method of claim 1, wherein said at least two catalysts are blended at the site of the FCCU in a weighed catalyst addition system.

10. The method of claim 5, wherein the individual catalysts are blended in a catalyst addition hopper located in the FCCU.

11. The method of claim 1, wherein said mixture of at least two individual FCC catalysts does not contain a binder.

12. The method of claim 1, wherein said mixture of at least two individual catalysts consists essentially of said at least two catalysts, and, optionally, one or more FCC additives.

13. The method of claim 1, further including introducing said mixture of catalysts into the FCCU.

* * * * *